Figure 1:
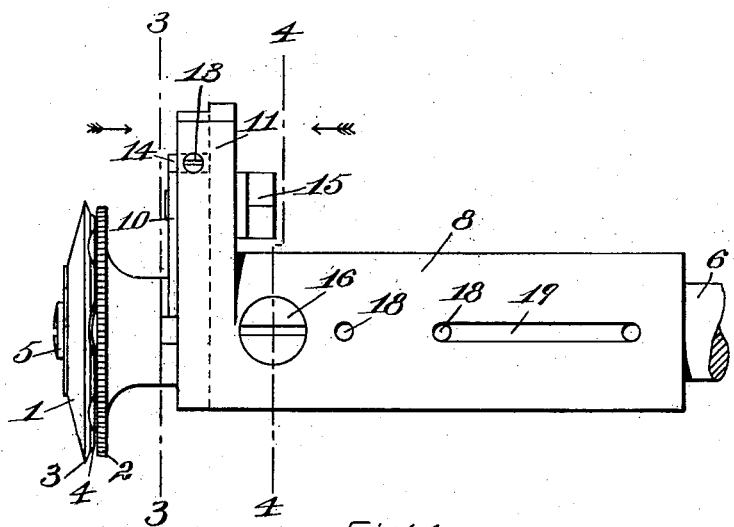

No. 739,857. PATENTED SEPT. 29, 1903.
H. W. GOULD.
HEEL BEADING MACHINE.
APPLICATION FILED DEC. 24, 1900.
NO MODEL.

WITNESSES
Edward S. Day
Horace Van Everen

INVENTOR
Howard W. Gould
by his Attorney
Benjamin Phillips

No. 739,857. Patented September 29, 1903.

UNITED STATES PATENT OFFICE.

HOWARD W. GOULD, OF BOSTON, MASSACHUSETTS, ASSIGNOR, BY DIRECT AND MESNE ASSIGNMENTS, TO UNITED SHOE MACHINERY COMPANY, OF PATERSON, NEW JERSEY, A CORPORATION OF NEW JERSEY.

HEEL-BEADING MACHINE.

SPECIFICATION forming part of Letters Patent No. 739,857, dated September 29, 1903.

Application filed December 24, 1900. Serial No. 40,920. (No model.)

*To all whom it may concern:*

Be it known that I, HOWARD W. GOULD, a citizen of the United States, residing at Boston, in the county of Suffolk and State of Massachusetts, have invented certain new and useful Improvements in Heel-Beading Machines; and I do hereby declare the following to be a full, clear, and exact description of the invention, such as will enable others skilled in the art to which it appertains to make and use the same.

The present invention relates to heel-beading machines of the type disclosed in United States Letters Patent No. 388,790, granted to Joshua H. Ryder August 28, 1888, which comprise an edge hammering or ironing tool, termed the "beading-tool," and a tool for forming a line of indentations below the edge acted on by the beading-tool, termed the "indenting-tool." In such machines as now constructed the tools are mounted concentrically to rotate in fixed bearings, the beading-tool being positively driven at a high rate of speed and the indenting-tool being free to rotate and driven by contact with the surface of the heel only. By this construction it is impossible to vary the depth of the indentations produced by the indenting-tool without replacing either the beading-tool or the indenting-tool with a tool of a different size. As the depth of the indentations varies in different styles of shoes, this necessitates a considerable stock of tools. Moreover, it is found in practice that the work-engaging surface of the beading-tool soon wears away, thereby allowing the indenting-tool to produce deeper indentations than is desirable and necessitating the replacing of one of the tools with a new tool.

The object of my invention is to produce a heel-beading machine which shall be free from the objectionable features above referred to; and with this object in view my invention consists in providing a heel-beading machine with a rotary beading-tool and a rotary indenting-tool, the work-engaging surfaces of which are relatively adjustable transversely to the axes of the tools. By so adjusting the work-engaging surfaces of the tools the indenting-tool can be caused to produce indentations of any desired depth and the wearing away of the work-engaging surface of the beading-tool can be compensated for, whereby the necessity of a large stock of tools is avoided and the life of the indenting-tool is prolonged without affecting the quality of the work produced.

Many constructions might be devised for producing a relative adjustment of the work-engaging surfaces of the tools, all of which I consider within the purview of my invention broadly considered. I prefer, however, to relatively adjust the tools bodily; and my invention also consists in providing a heel-beading machine with a rotary beading-tool and a rotary indenting-tool which are relatively adjustable transversely to the axes of the tools.

My invention also consists in the devices and combinations of devices hereinafter described and claimed.

A preferred form of my invention is illustrated in the accompanying drawings, in which—

Figure 2:
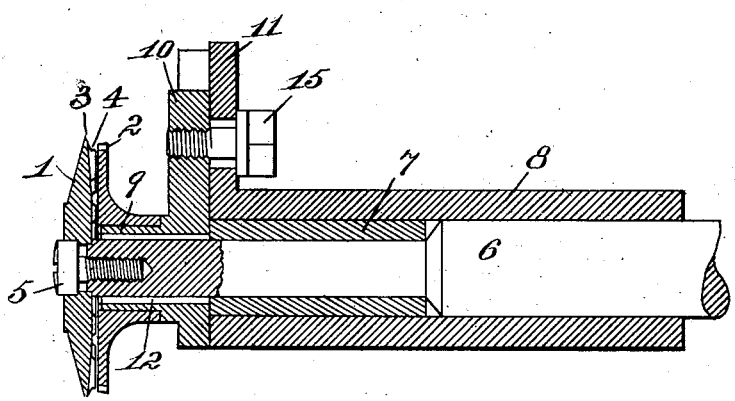
Figures 3, 4:
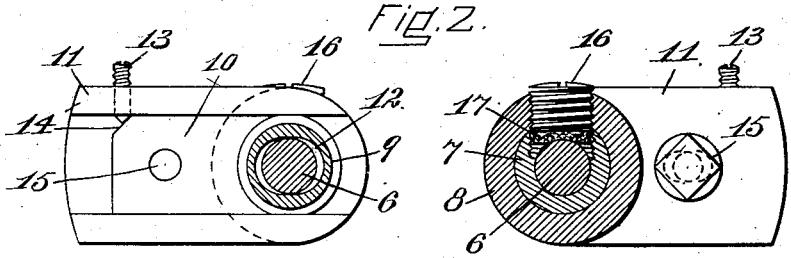

Figure 1 is a plan view of so much of a heel-beading machine embodying my invention as is necessary to show the construction and mode of operation thereof. Fig. 2 is a sectional plan view of the parts shown in Fig. 1. Fig. 3 is a transverse sectional view on the line 3 3 of Fig. 1 looking in the direction of the arrow, and Fig. 4 is a similar view on the line 4 4 of Fig. 1 looking in the opposite direction.

Referring to the drawings, in which like characters of reference indicate like parts, 1 indicates the heel-beading tool, and 2 the indenting-tool. The heel-beading tool 1 is of substantially the same construction as the tool described and claimed in my allowed application for a heel-beading tool filed September 1, 1900, Serial No. 30,655, and consists of a disk provided with a flange 3, which enters the crease between the upper and the heel, and a work-engaging surface 4. The inner face of the disk or the face next to the indenting-tool is provided with a central recess and with radial grooves which extend nearly to the edge of the flange 3, and thus interrupt the work-engaging surface 4 and inner surface of flange 3. The tool 1 is secured by means of a headed screw 5 to the reduced outer end of a shaft 6, which is positively driven by any suitable means. The reduced portion of the shaft 6 is journaled in a steel bushing 7, secured in a cylindrical block 8, which is clamped in the frame of the machine by any suitable means. The indenting-tool 2 is provided upon its periphery or work-engaging surface with a series of teeth, which are adapted to form a line of indentations in the surface of the heel below the edge acted on by the beading-tool and is mounted so as to be free to rotate upon a bearing 9, surrounding the shaft 6 and carried by the slide 10. The slide 10 is mounted in suitable guideways formed in the end of the block 8 and a projection 11, extending laterally therefrom. The shaft 6 extends through an oblong slot 12, formed in the slide 10 and bearing 9, whereby the slide 10 and bearing 9 can be adjusted transversely of the shaft. For so adjusting the slide and bearing and holding them in adjusted position a bevel-ended screw 13, having a screw-threaded engagement with the projection 11 on the block 8 and bearing against an incline 14 on the end of the slide 10, and a headed screw 15, passing through a slot in the projection 11 and having a screw-threaded engagement with the slide 10, are provided. By means of this construction it will be seen that the slide 10 and bearing 9 can be adjusted transversely of the shaft 6, and thereby cause the work-engaging surface of the tool 2 to extend more or less beyond the work-engaging surface 4 of the tool 1. By this means the indenting-tool can be caused to produce indentations of any desired depth, and the wearing away of the work-engaging surface 4 of the tool 1 can be compensated for. 16 designates a screw passing through the block 8 and into the bushing 7 to prevent the rotation of the bushing in the block. A friction-pad 17 is pressed by the screw into contact with the reduced portion of the shaft 6 and serves as a means for heating the shaft and tools. The block 8 is also provided with oil-holes 18, two of which are connected by a shallow groove 19 and lead to the enlarged portion of shaft 6, which is journaled in the block 8, and the other of which leads to the reduced portion of the shaft.

The construction above described affords a convenient and compact means for producing a relative adjustment of the work-engaging surfaces of the tools and embodies my invention in the best form at present known to me. It is to be understood, however, that my invention is not limited to any particular construction, but may be embodied in many different constructions without departing from the spirit thereof.

Having thus described my invention, I claim as new and desire to secure by Letters Patent of the United States—

1. A heel-beading machine, having, in combination, a rotary beading-tool and a rotary indenting-tool mounted to rotate independently of each other, the work-engaging surfaces of said tools being relatively adjustable transversely to the axes of the tools, substantially as described.

2. A heel-beading machine, having, in combination, a rotary beading-tool and a rotary indenting-tool mounted to rotate independently of each other, said tools being relatively adjustable transversely to the axes of the tools, substantially as described.

3. A heel-beading machine, having, in combination, a rotary beading-tool, a rotary indenting-tool, a shaft to which the beading-tool is secured and a bearing for the indenting-tool surrounding said shaft adjustable transversely of said shaft, substantially as described.

4. A heel-beading machine, having, in combination, a rotary beading-tool, a rotary indenting-tool, a shaft to which the beading-tool is secured, a bearing for the indenting-tool surrounding said shaft and a slide carrying said bearing adjustable transversely of said shaft, substantially as described.

5. A heel-beading machine, having, in combination, a rotary beading-tool and a rotary indenting-tool mounted to rotate independently of each other, and means for adjusting the indenting-tool transversely to the axes of the tools, substantially as described.

6. A heel-beading machine, having, in combination, a rotary beading-tool, and means for rotating the same, a rotary indenting-tool mounted independently of the beading-tool and free to be rotated by the contact of the tool with the heel of a shoe, and means for adjusting the indenting-tool transversely to the axes of the tools, substantially as described.

7. A heel-beading machine, having, in combination, a rotary beading-tool, and means for rotating the same, a rotary indenting-tool mounted independently of the beading-tool and free to be rotated by the contact of the tool with the heel of a shoe, and means for relatively adjusting said tools transversely to the axes of the tools, substantially as described.

In testimony whereof I affix my signature in presence of two witnesses.

HOWARD W. GOULD.

Witnesses:
 FRED O. FISH,
 ALFRED H. HILDRETH.